US012108888B2

(12) United States Patent
Bond

(10) Patent No.: US 12,108,888 B2
(45) Date of Patent: Oct. 8, 2024

(54) JEWELRY STAND

(71) Applicant: Beyond Centerline Solutions LLC, Colorado Springs, CO (US)

(72) Inventor: Richard Michael Bond, Colorado Springs, CO (US)

(73) Assignee: Beyond Centerline Solutions LLC, Colorado Springs, CO (US)

( * ) Notice: Subject to any disclaimer, the term of this patent is extended or adjusted under 35 U.S.C. 154(b) by 0 days.

(21) Appl. No.: 18/150,494

(22) Filed: Jan. 5, 2023

(65) Prior Publication Data

US 2024/0225315 A1 Jul. 11, 2024

(51) Int. Cl.
*A47F 7/02* (2006.01)
*A47F 5/03* (2006.01)
*F16M 11/10* (2006.01)

(52) U.S. Cl.
CPC ................ *A47F 7/02* (2013.01); *A47F 5/03* (2013.01); *F16M 11/10* (2013.01)

(58) Field of Classification Search
CPC .......... A47F 7/02; A47F 7/022; A47F 5/0876; A47F 5/0006; A47F 5/03; A47F 7/005; A47F 7/024; A47F 5/02; A47F 3/085; F16M 11/10; A47B 49/00; A47B 49/02
USPC ..... 211/85.2, 85.5, 44, 163, 70, 78–80, 164, 211/165; 206/6.1, 566
See application file for complete search history.

(56) References Cited

U.S. PATENT DOCUMENTS

| | | | | |
|---|---|---|---|---|
| 1,460,685 | A | * | 7/1923 | Seaman ............. A47G 25/0664 211/164 |
| 2,962,156 | A | * | 11/1960 | Adams ................... A45C 11/16 206/559 |
| 3,290,238 | A | * | 12/1966 | Wierwille .............. C25D 17/08 204/297.1 |
| 3,339,745 | A | * | 9/1967 | Sugerman ................. A47F 7/02 211/85.2 |

(Continued)

FOREIGN PATENT DOCUMENTS

| | | |
|---|---|---|
| CN | 217565612 U | 10/2022 |
| GB | 2181049 A | 4/1987 |

OTHER PUBLICATIONS

The Creative Cubby, "DIY Earring Holder", retrieved on Dec. 20, 2022, website: http://thecreativecubby.blogspot.com/2011/08/diy-earring-holder.html]; 17 pages.

(Continued)

*Primary Examiner* — Jennifer E. Novosad
(74) *Attorney, Agent, or Firm* — Briggs Intellectual Property Law

(57) ABSTRACT

A jewelry stand may include a base, a first vertical elongated member and a second vertical elongated member attached perpendicularly to the base. The first vertical elongated member and the second vertical elongated member may be disposed at a predetermined distance from each other. The jewelry stand may further include a plurality of horizontal members disposed between the first vertical elongated member and the second vertical elongated member. The plurality of horizontal members may be configured to hold different jewelry items, for example a necklace, a stud earring, a hoop earring, and/or the like. The plurality of horizontal members may be disposed in a layered arrangement, for example at different distances from the base.

15 Claims, 4 Drawing Sheets

(56) References Cited

U.S. PATENT DOCUMENTS

| | | | | |
|---|---|---|---|---|
| D249,607 S | * | 9/1978 | Goldman | D6/571 |
| 4,141,453 A | * | 2/1979 | Hanan | A47F 5/02 |
| | | | | 211/85.2 |
| 4,181,224 A | * | 1/1980 | Aber | A47F 7/02 |
| | | | | 211/85.2 |
| 4,264,013 A | * | 4/1981 | Vollmer | A47G 29/08 |
| | | | | 211/85.2 |
| 4,322,007 A | * | 3/1982 | Feibelman | A47F 7/02 |
| | | | | 211/85.2 |
| D270,220 S | * | 8/1983 | Cuminale | D6/682.4 |
| 4,461,383 A | * | 7/1984 | Groff | A47F 7/03 |
| | | | | 206/6.1 |
| 4,775,053 A | * | 10/1988 | Geiger | A47F 7/02 |
| | | | | 211/85.2 |
| 4,966,287 A | * | 10/1990 | Snyder | A45C 11/16 |
| | | | | 211/85.2 |
| 4,978,001 A | * | 12/1990 | Nelson | A47B 46/00 |
| | | | | 248/222.52 |
| 5,067,617 A | * | 11/1991 | Caldwell | A47F 7/02 |
| | | | | 211/85.2 |
| 5,168,986 A | * | 12/1992 | Stenhouse | A47F 7/02 |
| | | | | 211/85.2 |
| 5,172,814 A | * | 12/1992 | Pell | A47F 5/0807 |
| | | | | 211/85.2 |
| D352,190 S | * | 11/1994 | Tucker | D6/682.2 |
| 5,449,073 A | * | 9/1995 | DeBeverly | A47F 7/00 |
| | | | | 211/85.2 |
| D368,583 S | * | 4/1996 | Sharer | D3/903 |
| 5,551,772 A | * | 9/1996 | Keffer | A47F 7/02 |
| | | | | 211/85.2 |
| 6,158,578 A | * | 12/2000 | Greiner | A47F 5/10 |
| | | | | 211/85.2 |
| D441,592 S | * | 5/2001 | Lin | D6/682.4 |
| 6,361,130 B1 | * | 3/2002 | Kardy | A47B 81/00 |
| | | | | 211/85.2 |
| D473,731 S | * | 4/2003 | Banks | D6/672 |
| 6,991,118 B2 | * | 1/2006 | Phillips | A47B 81/00 |
| | | | | 211/49.1 |
| D532,994 S | * | 12/2006 | Rice | D6/682.6 |
| 7,182,416 B1 | * | 2/2007 | Greiner | A47F 7/02 |
| | | | | 312/309 |
| 7,207,635 B2 | * | 4/2007 | Simmons | A47F 3/005 |
| | | | | 206/6.1 |
| 7,828,254 B2 | * | 11/2010 | Stephens-De Alanis | A45D 44/00 |
| | | | | 248/309.4 |
| 8,070,025 B1 | * | 12/2011 | Nelson | A47G 25/14 |
| | | | | 211/85.2 |
| 8,141,721 B2 | * | 3/2012 | Harris-Bowman | A45C 11/16 |
| | | | | 211/85.2 |
| 8,627,950 B2 | * | 1/2014 | Bland | A45C 11/16 |
| | | | | 211/85.2 |
| 9,596,949 B1 | * | 3/2017 | Scampoli | A47F 7/12 |
| 9,723,904 B1 | * | 8/2017 | Taylor | A47B 96/20 |
| 10,394,297 B1 | * | 8/2019 | Han | G04D 1/06 |
| D928,528 S | * | 8/2021 | Liu | D6/514 |
| D932,222 S | | 10/2021 | Liu | |
| D1,005,020 S | * | 11/2023 | Qiao | D6/657 |
| 2005/0194336 A1 | * | 9/2005 | Wu | A47B 49/002 |
| | | | | 211/164 |
| 2007/0193969 A1 | * | 8/2007 | Albanese | A47F 7/02 |
| | | | | 211/85.2 |
| 2011/0215063 A1 | * | 9/2011 | Wolpert | A45C 11/16 |
| | | | | 211/85.2 |
| 2013/0140256 A1 | * | 6/2013 | Sharp | A47F 7/02 |
| | | | | 211/85.2 |
| 2023/0404228 A1 | * | 12/2023 | Holland | A45C 11/16 |
| 2024/0019075 A1 | * | 1/2024 | Davidson | F16M 11/10 |

OTHER PUBLICATIONS

"Jewelry Rack Tree with 4 T-Shape Metal Bars Jewelry Display Stand Holder Storage Drawer for Long Necklace Bracelet Ring", retrieved on Dec. 20, 2022, website: https://www.walmart.com/ip/Jewelry-Rack-Tree-with-4-T-Shape-Metal-Bars-Jewelry-Display-Stand-Holder-Storage-Drawer-for-Long-Necklace-Bracelet-Ring/459625421; 4 pages.

"Jewelry Organizer Stand Jewelry Organizer Display Stand with 3 Tier, Necklace Bracelet Rings Holder Display Stand, Wood and Velvet T-Bar Table Top Jewelry Tower, Thin Roll Jewelry Holder", retrieved on Dec. 20, 2022, website: https://www.amazon.com/Jewelry-Organizer-Display-Necklace-Bracelet/dp/B0B1ZD77R4]; 4 pages.

"Bon Maxie", retrieved on Dec. 20, 2022, website: https://www.bonmaxie.com.au/collections/all-earring-holders/products/easydrop-earring-holder-accessory-stand-lilac?variant=39781960941740]; 4 pages.

* cited by examiner

JEWELRY STAND

TECHNICAL FIELD

The present disclosure relates to an apparatus to organize jewelry items, and more specifically to a jewelry stand that may be configured to organize different types of jewelry items.

BACKGROUND

Jewelry items, such as necklaces, bracelets, rings, brooches and earrings, are typically small and expensive. Jewelry owners prefer to store the jewelry items at places that are easily accessible and safe. Further, the jewelry owners usually prefer to display their expensive jewelry possession to others. For example, jewelry shop owners or people at home use jewelry stands or display racks to organize, store and display jewelry items.

A conventional jewelry stand may be configured to organize a single jewelry type. For example, a conventional jewelry stand may be configured to organize and display only necklaces, or only stud earrings or bangles. Thus, the jewelry owners may be required to use different jewelry stands to organize and display different types of jewelry items that the owners may possess. Using different jewelry stands may cause inconvenience to jewelry owners, and the jewelry stands may consume substantial space.

Thus, there is a need for a jewelry stand that enables jewelry owners to conveniently organize and display different types of jewelry items in a single jewelry stand.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a jewelry stand that may be used to organize and display jewelry items, specifically necklaces and earrings. The jewelry stand may include a first elongated vertical member and a second elongated vertical member, which may be attached to a jewelry stand base. Each elongated vertical member may be disposed at a predetermined distance from each other. The jewelry stand may further include a plurality of horizontal members that may be disposed between the first elongated vertical member and the second elongated vertical member. The plurality of horizontal members may be disposed in a layered arrangement (e.g., the plurality of horizontal members may be disposed at different distances from the jewelry stand base). The plurality of horizontal members may be configured to hold necklaces and earrings.

In some aspects, the plurality of horizontal members may include a first horizontal member, a second horizontal member, and a third horizontal member. The first horizontal member may include a hang-wire or a rod that may be configured to hold hoop earring(s). The second horizontal member may include a "C-shaped" tube that may include a plurality of slots in a second horizontal member front portion and a second horizontal member back portion. The second horizontal member may be configured to hold stud earring(s) in adjacent slots. Alternatively, the second horizontal member may include a plurality of comb teeth that may be configured to hold the stud earring(s). The third horizontal member may include a roller or a rotating member that may enable the user to rotate the third horizontal member axially relative to a third horizontal member longitudinal axis. The third rotating member may be configured to hold necklace(s). In this manner, a jewelry stand user may organize and display different types of jewelry items, e.g., stud earrings, hoop earrings, necklaces in the same jewelry stand.

The present disclosure discloses a jewelry stand that may hold different types of jewelry items. Further, the jewelry stand, as proposed in the present disclosure, enables the jewelry stand user to store and display different types of jewelry items in the same jewelry stand simultaneously. Therefore, the jewelry stand user is not required to use/purchase different jewelry stands for different types of jewelry items. In addition, the jewelry stand includes dedicated horizontal members to hold necklaces and earrings. Therefore, the necklaces are not tangled with other jewelry items when the necklaces are placed on the jewelry stand.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
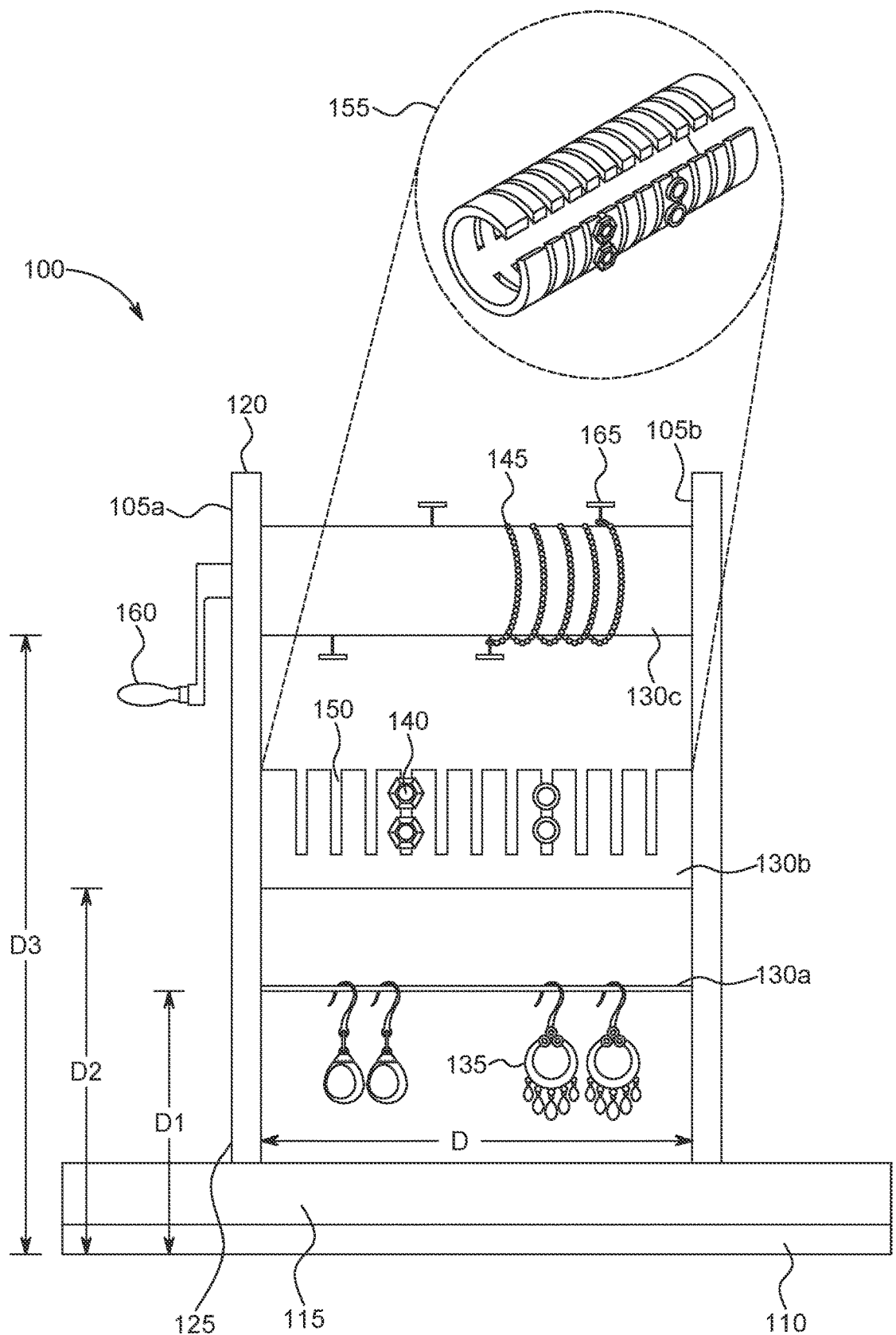
FIG. 1 depicts a front view of an example apparatus to organize jewelry items in accordance with the present disclosure.

FIG. 1 depicts a front view of an example apparatus 100 to organize jewelry items in accordance with the present disclosure. The apparatus 100 may be, for example, a jewelry stand that may enable a user (e.g., a jewelry item owner) to organize and display one or more jewelry items. Hereinafter, the apparatus 100 is referred to as a jewelry stand 100.

The jewelry stand 100 may be configured to organize and display jewelry items, such as necklaces, bracelets, earrings, and/or the like. Specifically, the jewelry stand 100 may have a dedicated structure to organize and display earrings. Examples of the earrings include, but are not limited to, stud earrings, drop earrings, cluster earrings, dangle earrings, hoop earrings, huggie earrings, and the like. In addition, the jewelry stand 100 may have a dedicated structure to organize and display necklaces. Separate structures to organize and display necklaces and earrings may ensure that necklaces are not tangled with the earrings (or any other jewelry item) that the jewelry stand 100 may organize and display.

The jewelry stand 100 may include a first vertical elongated member 105a and a second vertical elongated member 105b that may be perpendicularly attached to a base plate or a base 110. The first vertical elongated member 105a and the second vertical elongated member 105b may be made of plastic, metal and/or wood. For example, the first vertical elongated member 105a and the second vertical elongated member 105b may be made from hardwood such as oak, maple, teak, sapele, iroko or from coniferous wood. Similarly, the base 110 may be made of same material as the first vertical elongated member 105a and the second vertical elongated member 105b or may be made from a different material. For example, in one or more aspects, the first vertical elongated member 105a, the second vertical elongated member 105b and the base 110 may be made of oak. In other aspects, the first vertical elongated member 105a and the second vertical elongated member 105b may be made of plastic, and the base 110 may be made of oak (or any other type of wood).

The first vertical elongated member 105a and the second vertical elongated member 105b may be of any shape. For example, each vertical elongated member (105a, 105b) may be cuboid or cylindrical in shape. In some aspects, each vertical elongated member (105a, 105b) may include magnetic strips or may have magnetic coating. In other aspects, each vertical elongated member (105a, 105b) may have a metallic or a paint coating to form a glass-smooth finish. In a similar manner, the base 110 may include a plurality of magnetic strips or may have magnetic coating.

Further, each vertical elongated member (105a, 105b) may be of same length and width/diameter. For example, in one or more aspects, each vertical elongated member (105a, 105b) may have a length in a range of 8 to 12 inches and may have a width/diameter in a range of 0.5 to 1.5 inches. In an exemplary aspect, each vertical elongated member (105a, 105b) may have a length of 10 inches. In further aspects, the base 110 may be rectangular, with one dimension (e.g., length) in a range of 10-14 inches and another dimension (e.g., breadth) in a range of 4 to 8 inches. In an exemplary aspect, the base 110 may have a length of 12 inches and a breadth of 6 inches. The base 110 may further include a rim 115 that may be disposed along base 110 edges. A rim 115 height may be in a range of 0.5 to 1.5 inches, and may configured to collect or protect any jewelry item that may be organized or displayed on the jewelry stand 100 (e.g., when the jewelry item falls on the base 110). In an exemplary aspect, the rim 115 height may be 1 inch.

A person ordinarily skilled in the art may appreciate that vertical elongated member (105a, 105b) and base 110 shapes and dimensions described above are just examples and are not intended to limit the present disclosure scope.

Each vertical elongated member (105a, 105b) may include a proximal end 120 and a distal end 125. The proximal end 120 may have a flat or a round shape. The distal end 125 may have a flat shape (not shown) and may be attached to the base 110. Stated another way, the first vertical elongated member 105a and the second vertical elongated member 105b may be attached to the base 110 via respective distal ends 125. Further, the first vertical elongated member 105a and the second vertical elongated member 105b may be disposed at a predetermined distance "D" from each other. Specifically, the distal ends 125 may be arranged at the predetermined distance "D" from each other, such that a jewelry holding space may be formed between the first vertical elongated member 105a and the second vertical elongated member 105b. In some aspects, the distance "D" may be, for example, in a range of 7 to 10 inches. In an exemplary aspect, the distance "D" may be 9 inches.

In some aspects, a distance between the distal ends 125 of two vertical elongated members (105a, 105b) may be same as a distance between the corresponding proximal ends 120. Stated another way, as shown in FIG. 1, the first vertical elongated member 105a and the second vertical elongated member 105b may be parallel to each other.

The jewelry stand 100 may further include one or more horizontal members 130a, 130b, 130c (collectively referred to as a plurality of horizontal members 130) disposed between the first vertical elongated member 105a and the second vertical elongated member 105b. The plurality of horizontal members 130 may be disposed in a layered arrangement and may be configured to hold jewelry items of different types. In some aspects, the plurality of horizontal members 130 may be attached to the first vertical elongated member 105a and the second vertical elongated member 105b by using one or more fastening means including, but not limited to, adhesive, welding, nails, screws, and/or the like. In some aspects, each horizontal member 130 may be attached to the first vertical elongated member 105a and the second vertical elongated member 105b by using a different type of fastening means.

In an exemplary aspect, the first horizontal member 130a may be disposed at a first distance "D1" (e.g., in range of 2 to 3 inches) from the base 110, the second horizontal member 130b may be disposed at a second distance "D2" (e.g., in range of 4 to 6 inches) from the base 110, and the third horizontal member 130c may be disposed at a third distance "D3" (e.g., in range of 7 to 9 inches) from the base 110. The distance "D3" may be greater than the distance "D2", which in turn may be greater than the distance "D1".

A person ordinarily skilled in the art may appreciate from the description above that the first horizontal member 130a, the second horizontal member 130b and the third horizontal member 130c may be disposed in a layered arrangement between the first vertical elongated member 105a and the second vertical elongated member 105b. The first horizontal member 130a may be disposed in proximity to the base 110, and the second horizontal member 130b may be disposed between the first horizontal member 130a and the third horizontal member 130c. In some aspects, the plurality of horizontal members may be disposed equidistant from each other. In other aspects, the plurality of horizontal members may be disposed at any distance from each other.

The first horizontal member 130a may be configured to hold and display a first jewelry type. For example, the first horizontal member 125a may hold hook type earring(s) 135, as shown in FIG. 1. The second horizontal member 130b may be configured to hold a second jewelry type. For example, the second horizontal member 130b may hold stud earring(s) 140. The third horizontal member 130c may be configured to hold a third jewelry type. For example, the third horizontal member 130c may hold necklace(s) 145. The structural details of each horizontal member may be understood as follows.

The first horizontal member 130a may include a rod or a wire (e.g., a hang-wire) that may be rigidly attached to the first vertical elongated member 105a and the second vertical elongated member 105b via adhesive or by welding (or by using nails or screws). The first horizontal member 130a may be cylindrical in shape, and may be made of any material including, but not limited to, iron, steel, brass, bronze, copper, aluminum, zinc, gold, silver, and/or platinum. The first horizontal member 130a may be of any thickness, which may enable receiving and holding of the hoop earring(s) 135. In some aspects, first horizontal member 130*a* thickness (e.g., diameter) may be consistent throughout first horizontal member 130*a* length. The first horizontal member 130*a* length may be same as or equivalent to the distance "D" between the first vertical elongated member 105*a* and the second vertical elongated member 105*b*.

In some aspects, the second horizontal member 130*b* may include a "C" shaped flexible tubular body (or tube) that may have an open end at a tube top surface. The open end may be formed along a second horizontal member 130*b* length. The second horizontal member 130*b* length may be same as or equivalent to the distance "D", and a second horizontal member 130*b* diameter may be in a range of 1 to 2 inches. The second horizontal member 130*b* may include a plurality of slots 150 that may be formed/disposed along the open end (i.e., along the second horizontal member 130*b* length). The plurality of slots 150 may be disposed at approximately equal distance from adjacent slots. Further, in an exemplary aspect, each slot 150 may have a width in a range of 0.1 to 0.2 inches, and a length in range of 50-80% of the second horizontal member 130*b* diameter. The user may insert the stud earring(s) 140 between adjacent slots 150 to hold and display the stud earring(s) 140 on the jewelry stand 100.

In some aspects, the second horizontal member 130*b* may include the plurality of slots 150 at a second horizontal member 130*b* front portion and a second horizontal member 130*b* back portion. Stated another way, the second horizontal member 130*b* may enable the user to hold the stud earring 140 in the second horizontal member 130*b* front portion as well the second horizontal member 130*b* back portion. A person ordinarily skilled in the art may appreciate that such an arrangement of the plurality of slots 150 on the second horizontal member 130*b* may enable the user to use the jewelry stand 100 (e.g., to hold and display jewelry items) from both sides of the jewelry stand 100 (i.e., jewelry stand 100 front side and jewelry stand 100 back side). An isometric view of the second horizontal member 130*b* is shown as view 155 in FIG. 1.

The second horizontal member 130*b* may be made of any material including, but not limited to, plastic, wood, iron, steel, brass, bronze, copper, aluminum, zinc, gold, silver, and/or platinum. Further, second horizontal member 130*b* thickness (i.e., thickness of tube walls) may be in range of 0.05 to 0.1 inches.

The third horizontal member 130*c* may be a cylindrical body that may be configured to rotate axially relative to a third horizontal member 130*c* longitudinal axis. Specifically, the third horizontal member 130*c* may include a roller or a rotating member that may enable the user to rotate the third horizontal member 130*c* axially relative to the third horizontal member 130*c* longitudinal axis.

In an exemplary aspect, the third horizontal member 130*c* may include a shaft or a rod (not shown) disposed in a third horizontal member 130*c* interior surface (or a third horizontal member 130*c* exterior surface) that may enable the third horizontal member 130*c* to rotate axially. The shaft or the rod may be connected to the first vertical elongated member 105*a* and the second vertical elongated member 105*b* via a roller arrangement (not shown) that may enable the third horizontal member 130*c* to rotate. In other aspects, the shaft or the rod may be connected to the first vertical elongated member 105*a* and the second vertical elongated member 105*b* via holes (not shown) that may be formed on the surfaces of the first vertical elongated member 105*a* and the second vertical elongated member 105*b*.

In some aspects, a third horizontal member 130*c* proximal end (or a shaft or rod proximal end) may be connected to a griping means or a handle crank 160 (or a handle/lever). The user may rotate the handle crank 160 clockwise or anticlockwise to rotate the third horizontal member 130*c* axially relative to a third horizontal member 130*c* longitudinal axis. The handle crank 160 may be of any shape including, but not limited to, "Z-shape," "S-shape," "L-shape," and/or the like. The handle crank 160 may be positioned on left side, right side or both sides of the jewelry stand 100.

A third horizontal member 130*c* length may be same as or equivalent to the distance "D", and a third horizontal member 130*c* diameter may be in a range of 1 to 2 inches. Further, the third horizontal member 130*c* may be formed of or include a flexible material, e.g., foam or flexible plastic, and may enable the user to conveniently insert fastening members, e.g., stick pins 165, to a third horizontal member 130*c* exterior surface. The stick pins 165 may enable the user to hold and "wrap" necklaces 145 around the third horizontal member 130*c* exterior surface.

In an exemplary aspect, the user may place a necklace 145 first end (not shown) on the third horizontal member 130*c* exterior surface, and may hold the necklace 145 first end on the third horizontal member 130*c* exterior surface by inserting a first stick pin in the third horizontal member 130*c* exterior surface through the necklace 145 first end. Thereafter, the user may rotate the third horizontal member 130*c* by using the handle crank 160, which may cause necklace 145 body to wrap around the third horizontal member 130*c* exterior surface. When an entire necklace 145 body is wrapped, the user may hold a necklace 145 second end on the third horizontal member 130*c* exterior surface by inserting a second stick pin in the third horizontal member 130*c* exterior surface through the necklace 145 second end. In this manner, the user may hold and display necklaces on the third horizontal member 130*c*.

A person ordinarily skilled in the art may appreciate that since the third horizontal member 130*c* is dedicatedly used to hold and display necklaces 145, the necklaces 145 are not tangled with other jewelry items (e.g., the hook type earrings 135 or the stud earrings 140). Further, the user may easily place and remove the necklaces 145 from the third horizontal member 130*c* by rotating the third horizontal member 130*c* clockwise or anticlockwise to wrap/unwrap the necklaces 145 from the third horizontal member 130*c* exterior surface.

The jewelry stand 100 may further include a bin (not shown) attached to the base 110 that may be configured to store the stick pins 165 (e.g., when the stick pins 165 are not in use or inserted into the third horizontal member 130*c* exterior surface). Furthermore, as already described above, the base 110 may include magnetic strips or may have magnetic coating that may hold any stick pin (or any jewelry item) that may fall from the third horizontal member 130*c* (or from the first and second horizontal members 130*a*, 130*b*), thus preventing the stick pins 165 (or jewelry items) from getting misplaced.

In some aspects, the jewelry stand 100 may include additional elements (not shown), for example, mirrors, jewelry stand cover, multiple compartments for accessories or other jewelry items, etc.

Furthermore, although the jewelry stand 100 is depicted to include three horizontal members 130, in additional aspects, more or less horizontal members may be present in the jewelry stand 100. In addition, two vertical elongated members 105*a*, 105*b* are depicted in FIG. 1. In some aspects, the jewelry stand 100 may include more than two vertical elongated members. In this case, the jewelry stand 100 may include one or more horizontal members disposed between adjacent vertical elongated members.

A person ordinarily skilled in the art may appreciate that the plurality of horizontal members may be disposed in a different arrangement than the arrangement described above. For example, the positions of the first and second horizontal members 130a, 130b may be swapped in some aspects.

Further, in some aspects, the jewelry stand 100 may be enclosed in box (not shown). The box may have one or more openings. For example, the box may be rectangular in shape and may correspond to jewelry stand 100 shape. The box may be configured to open from a top side and/or front side. The box may be made of any material including, but not limited to, plastic, glass, wood, metal, and/or the like.

The jewelry stand 100 may further include elements different from the elements shown in FIG. 1. Examples of different embodiments of the jewelry stand 100 are depicted in FIGS. 3 and 4, and described later in the description below.

Figure 2:
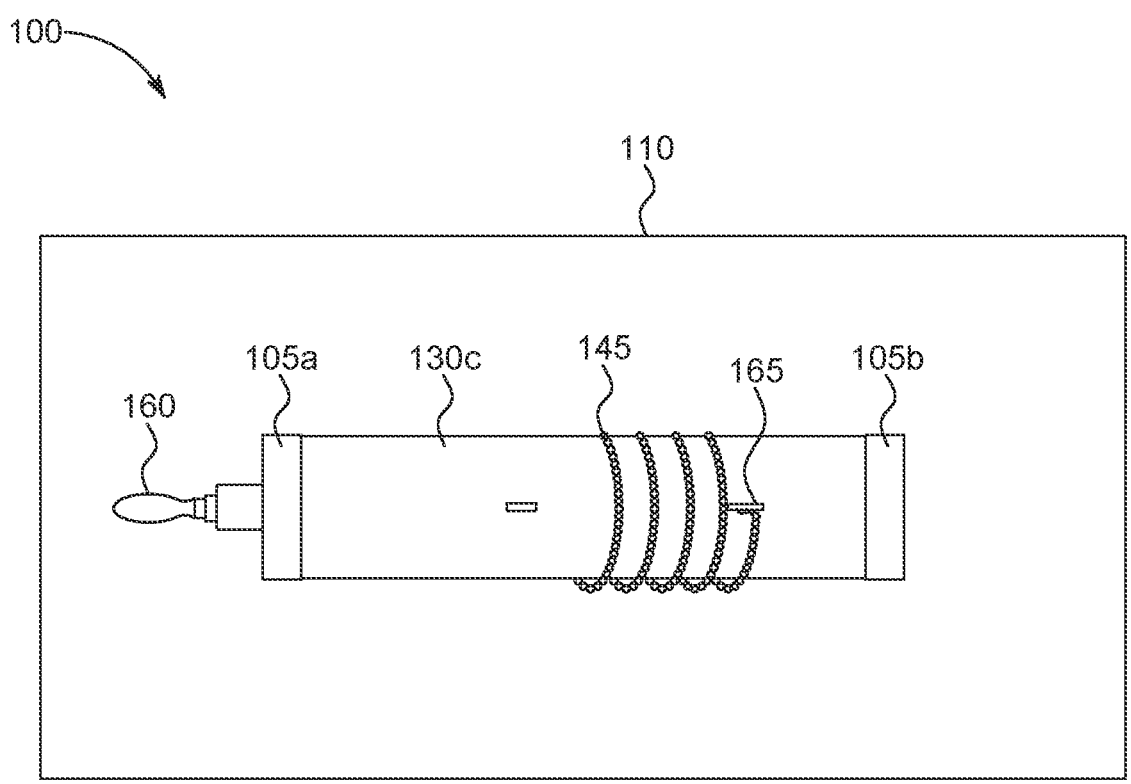
FIG. 2 depicts a top view of the apparatus of FIG. 1 in accordance with the present disclosure.

FIG. 2 depicts a top view of the jewelry stand 100 in accordance with the present disclosure. As shown in FIG. 2, the third horizontal member 130c may be visible in the top view. Since diameters/dimensions of the first and second horizontal members 130a, 130b are less than the third horizontal member 130c diameter, the first and second horizontal members 130a, 130b may not be visible in the top view. Further, as shown in FIG. 2, the base 110 may include vacant or open spaces (i.e., without any elements) that may enable the base 110 to conveniently hold any stick pin or jewelry item that may fall from the first, second or third horizontal members 130a, 130b, 130c.

Figure 3:
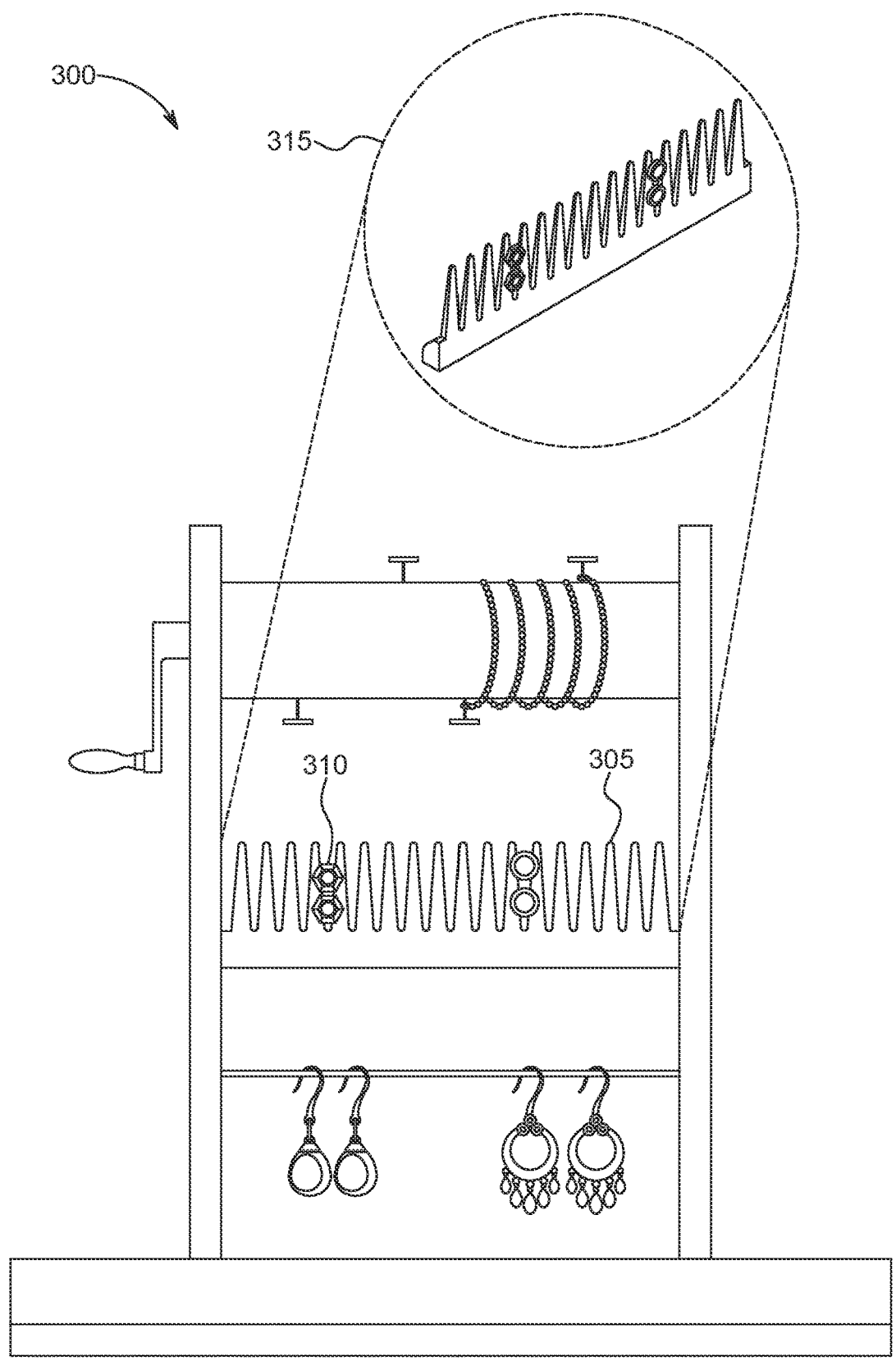
FIG. 3 depicts a front view of another example apparatus to organize jewelry items in accordance with the present disclosure.
Figure 4:
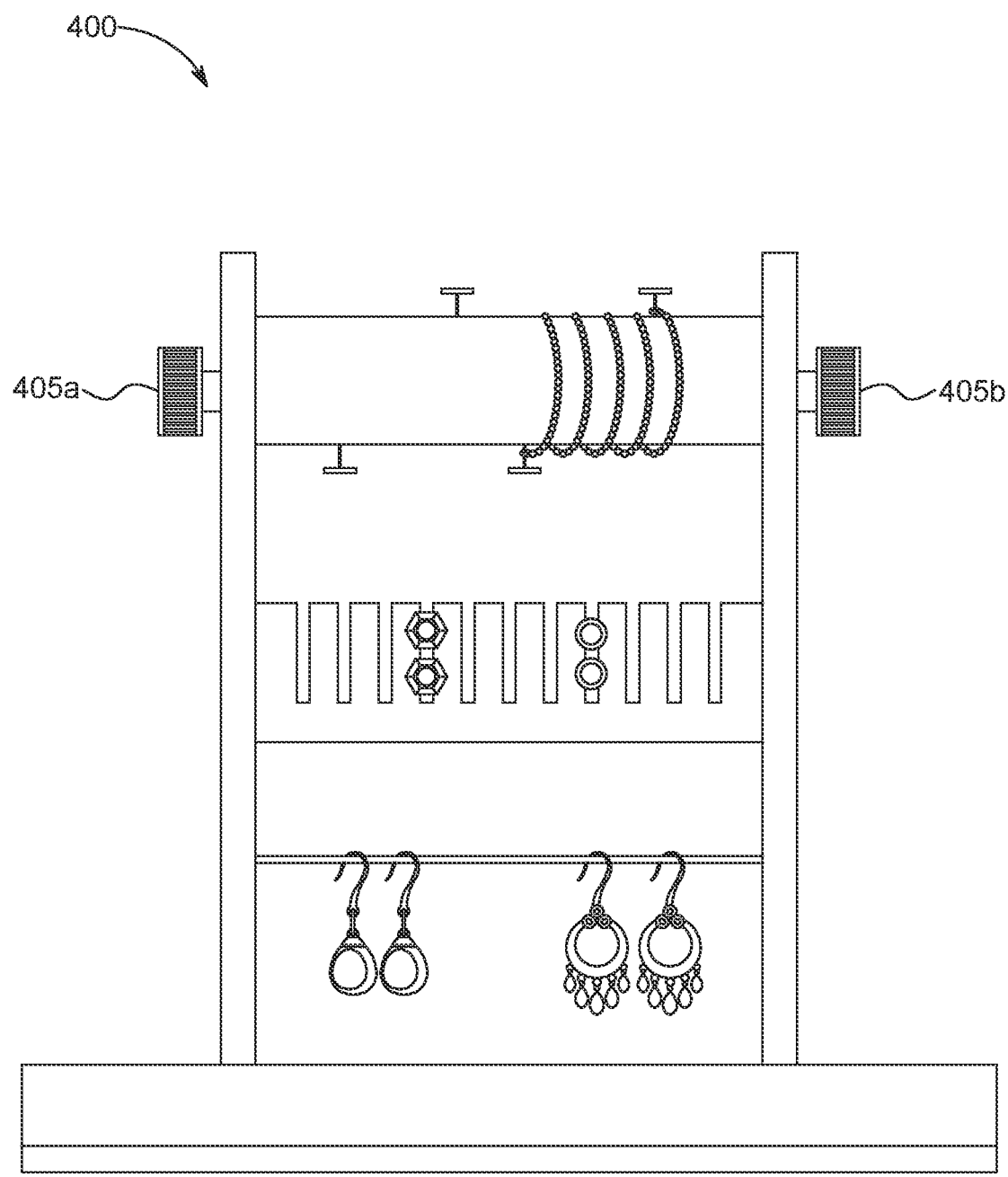
FIG. 4 depicts a front view of yet another example apparatus to organize jewelry items in accordance with the present disclosure.

FIG. 3 depicts a front view of another example apparatus 300 to organize jewelry items in accordance with the present disclosure. The apparatus 300 may be a jewelry stand (i.e., a jewelry stand 300), which may be similar to the jewelry stand 100. Specifically, the jewelry stand 300 may include same elements as the jewelry stand 100, however instead of having the "C" shaped flexible tubular body as the second horizontal member 130b, the jewelry stand 300 may include a second horizontal member that may be shaped as a cuboid, and may include a plurality of vertical comb teeth 305 formed at a second horizontal member top surface. The plurality of vertical comb teeth 305 may be formed along a second horizontal member length. Further, each vertical comb tooth may have a tooth distal end width in a range of 0.1 to 0.2 inches, and each vertical comb tooth may include a pointed end at a tooth proximal end. Stated another way, a tooth proximal end width may be substantially less than the tooth distal end width. Furthermore, as shown in FIG. 3, the plurality of vertical comb teeth 305 may form a continuous structure of comb teeth along the second horizontal member length, and may enable the user to hold and display a stud earing 310 between adjacent comb teeth. An isometric view of the second horizontal member 130b is shown as view 315 in FIG. 3.

Remaining jewelry stand 300 elements are same as jewelry stand 100 elements, and hence are not described again here for the sake of simplicity and conciseness.

In some aspects, the jewelry stand 300 may include both "C" shaped flexible tubular body and the plurality of vertical comb teeth 305 disposed on a single second horizontal member (not shown). In this case, the "C" shaped flexible tubular body may be disposed at a half portion of second horizontal member length, and the plurality of vertical comb teeth 305 may be disposed at the other half. In yet another aspect (not shown), the jewelry stand 300 may include two second horizontal members, one having the "C" shaped flexible tubular body and the second having the plurality of vertical comb teeth 305.

FIG. 4 depicts a front view of yet another example apparatus 400 to organize jewelry items in accordance with the present disclosure. The apparatus 400 may be a jewelry stand (i.e., a jewelry stand 400), which may be similar to the jewelry stand 100. Specifically, the jewelry stand 400 may include same elements as the jewelry stand 100, however instead of the handle crank 160 connected to the third horizontal member 130c proximal end, the jewelry stand 400 may include turn knobs 405a, 405b that may be connected to a third horizontal member distal end (or a shaft or rod distal end) and/or a third horizontal member proximal end. The user may rotate the turn knob 405a or the turn knob 405b clockwise or anticlockwise to rotate the third horizontal member axially relative to a third horizontal member longitudinal axis. The turn knobs 405a, 405b may be of any shape including, but not limited to, circular, rectangular or square.

Although FIG. 4 depicts two turn knobs 405a, 405b, in some aspects, the jewelry stand 400 may include one turn knob, e.g., either the turn knob 405a or the turn knob 405b.

Remaining jewelry stand 400 elements are same as the jewelry stand 100 elements, and hence are not described again here for the sake of simplicity and conciseness.

In additional aspects (not shown), the jewelry stand 400 may include both the turn knob 405a (or turn knob 405b) and the handle crank 160 connected to third horizontal member distal and proximal ends, respectively. The user may rotate the third horizontal member by using either the turn knob 405a (or turn knob 405b) or the handle crank 160.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An apparatus comprising:
    a base;
    a first vertical elongated member and a second vertical elongated member attached perpendicularly to the base, wherein the first vertical elongated member and the second vertical elongated member are disposed at a predetermined distance from each other;
    a first horizontal member disposed between the first vertical elongated member and the second vertical elongated member, wherein:
        the first horizontal member is configured to hold a first jewelry type, and
        the first horizontal member is disposed at a first distance from the base; and
    a second horizontal member disposed between the first vertical elongated member and the second vertical elongated member, wherein:
        the second horizontal member is configured to hold a second jewelry type,
        the second horizontal member is disposed at a second distance from the base,
        the second horizontal member is configured to rotate axially relative to a second horizontal member longitudinal axis,
        the second horizontal member is attached to a handle crank at a second horizontal member proximal end, and
        the second horizontal member is attached to a turn knob at a second horizontal member distal end.

2. The apparatus of claim 1, wherein:
    each of the first vertical elongated member and the second vertical elongated member comprises a vertical member proximal end and a vertical member distal end, and
    each of the first vertical elongated member and the second vertical elongated member is attached to the base via the vertical member distal end.

3. The apparatus of claim 1, wherein the first horizontal member comprises a hang-wire.

4. The apparatus of claim 1 further comprising:
    a third horizontal member disposed between the first vertical elongated member and the second vertical elongated member, wherein:
        the third horizontal member is configured to hold a third jewelry type, and
        the third horizontal member is disposed at a third distance from the base.

5. The apparatus of claim 4, wherein the third distance is greater than the first distance, and wherein the third distance is less than the second distance.

6. The apparatus of claim 4, wherein the third horizontal member comprises a C-shaped flexible tube having a plurality of slots disposed along a tube length, and wherein the plurality of slots is configured to hold the third jewelry type between two adjacent slots.

7. The apparatus of claim 4, wherein the third horizontal member comprises a plurality of vertical comb teeth, and wherein the plurality of vertical comb teeth is configured to hold the third jewelry type between two adjacent vertical comb teeth.

8. An apparatus comprising:
    a base;
    a first vertical elongated member and a second vertical elongated member attached perpendicularly to the base, wherein the first vertical elongated member and the second vertical elongated member are disposed at a predetermined distance from each other; and
    a first horizontal member disposed between the first vertical elongated member and the second vertical elongated member, wherein:
        the first horizontal member is configured to hold a first jewelry type,
        the first horizontal member is disposed at a first distance from the base,
        the first horizontal member is configured to rotate axially relative to a first horizontal member longitudinal axis,
        the first horizontal member is attached to a handle crank at a first horizontal member proximal end, and
        the first horizontal member is attached to a turn knob at a first horizontal member distal end.

9. The apparatus of claim 8, wherein:
    each of the first vertical elongated member and the second vertical elongated member comprises a vertical member proximal end and a vertical member distal end, and
    each of the first vertical elongated member and the second vertical elongated member is attached to the base via the vertical member distal end.

10. The apparatus of claim 8 further comprising a second horizontal member disposed between the first vertical elongated member and the second vertical elongated member, wherein:
    the second horizontal member is configured to hold a second jewelry type, and
    the second horizontal member is disposed at a second distance from the base.

11. The apparatus of claim 10, wherein the first distance is greater than the second distance.

12. The apparatus of claim 10, wherein the second horizontal member comprises a hang-wire.

13. The apparatus of claim 10, wherein the second horizontal member comprises a C-shaped flexible tube having a plurality of slots disposed along a tube length, and wherein the plurality of slots is configured to hold the second jewelry type between two adjacent slots.

14. The apparatus of claim 10, wherein the second horizontal member comprises a plurality of vertical comb teeth, and wherein the plurality of vertical comb teeth is configured to hold the second jewelry type between two adjacent vertical comb teeth.

15. An apparatus comprising:
a base;
a first vertical elongated member and a second vertical elongated member attached perpendicularly to the base, wherein the first vertical elongated member and the second vertical elongated member are disposed at a predetermined distance from each other;
a first horizontal member disposed between the first vertical elongated member and the second vertical elongated member, wherein:
the first horizontal member is configured to hold a first jewelry type, and
the first horizontal member is disposed at a first distance from the base;
a second horizontal member disposed between the first vertical elongated member and the second vertical elongated member, wherein:
the second horizontal member is configured to hold a second jewelry type,
the second horizontal member is disposed at a second distance from the base,
the second horizontal member is configured to rotate axially relative to a second horizontal member longitudinal axis,
the second horizontal member is attached to a handle crank at a second horizontal member proximal end, and
the second horizontal member is attached to a turn knob at a second horizontal member distal end; and
a third horizontal member disposed between the first vertical elongated member and the second vertical elongated member, wherein:
the third horizontal member is configured to hold a third jewelry type, and
the third horizontal member is disposed at a third distance from the base.

\* \* \* \* \*